US012725723B2

(12) United States Patent
Neut et al.

(10) Patent No.: US 12,725,723 B2
(45) Date of Patent: Sep. 1, 2026

(54) ELECTROMAGNET COIL ASSEMBLY

(71) Applicant: VDL ENABLING TECHNOLOGIES GROUP EINDHOVEN B.V., Eindhoven (NL)

(72) Inventors: Matthijs Wouter Marc Neut, Eindhoven (NL); Jorrit Fedde Bloemhof, Eindhoven (NL)

(73) Assignee: VDL ENABLING TECHNOLOGIES GROUP EINDHOVEN B.V., Eindhoven (NL)

( * ) Notice: Subject to any disclaimer, the term of this patent is extended or adjusted under 35 U.S.C. 154(b) by 716 days.

(21) Appl. No.: 17/922,517

(22) PCT Filed: Apr. 30, 2021

(86) PCT No.: PCT/NL2021/050285
§ 371 (c)(1),
(2) Date: Oct. 31, 2022

(87) PCT Pub. No.: WO2021/221509
PCT Pub. Date: Nov. 4, 2021

(65) Prior Publication Data

US 2023/0178277 A1 Jun. 8, 2023

(30) Foreign Application Priority Data

May 1, 2020 (NL) ...................................... 2025477

(51) Int. Cl.
*H01F 6/06* (2006.01)
*H01F 41/04* (2006.01)

(52) U.S. Cl.
CPC ............. *H01F 6/06* (2013.01); *H01F 41/048* (2013.01)

(58) Field of Classification Search
CPC ........................................................ H01F 6/06
See application file for complete search history.

(56) References Cited

U.S. PATENT DOCUMENTS 4,554,731 A * 11/1985 Borden ................ H01F 41/048 29/760
2004/0061584 A1 4/2004 Darmann
(Continued)

FOREIGN PATENT DOCUMENTS

JP 2008305861 A 12/2008

OTHER PUBLICATIONS

Patent Cooperation Treaty, International Search Report, Application No. PCT/NL2021/050285, dated Jul. 28, 2021, in 2 pages.
(Continued)

*Primary Examiner* — Paul A Wartalowicz
(74) *Attorney, Agent, or Firm* — Procopio, Cory, Hargreaves & Savitch LLP

(57) ABSTRACT

The invention relates to an electromagnet coil assembly in particular an electromagnet coil assembly at least comprising a core; a winding constituting the coil being wound in a plurality of turns around said core; and multiple power taps for electrically connecting the winding to an external power circuit.
Most electromagnetic coils implementing HTS materials are wound for academic purposes, which are generally hand-wound. Any coil needs power leads or power taps of some sort. However, in academics applications, coils are usually "one-offs" and not much time is invested in the manufacturability on a large scale and quantity basis.
It is thus an object of the present invention to provide an electromagnet coil assembly implementing HTS materials, which coil assembly can be mass-manufactured in a reliable, robust and cost-effective manner.

12 Claims, 6 Drawing Sheets

(56) References Cited

U.S. PATENT DOCUMENTS

| | | | | |
|---|---|---|---|---|
| 2005/0212634 | A1* | 9/2005 | Baldwin | H01F 36/00 336/5 |
| 2012/0181953 | A1* | 7/2012 | Hsu | H01H 50/546 335/128 |
| 2018/0350489 | A1 | 12/2018 | Tosaka | |
| 2020/0194154 | A1* | 6/2020 | Markiewicz | H01F 6/02 |

OTHER PUBLICATIONS

Office Action received in KR10-2025-7030364, dated Jan. 7, 2026, in 11 pages (with translation).

Jiang, Zhenan et al. "AC Loss Measurements in a Hybrid REBCO/BSCCO Coil Assembly", IEEE Transactions on Applied Superconductivity, vol. 27, No. 6, Sep. 2017 (in 7 pages).

* cited by examiner

ELECTROMAGNET COIL ASSEMBLY

CROSS-REFERENCE TO RELATED APPLICATIONS

This application is US National Stage of International Patent Application PCT/NL2021/050285, filed Apr. 30, 2021, which claims benefit of priority from Dutch Patent Application NL 2025477, filed May 1, 2020, the contents of both of which are incorporated herein by reference.

BACKGROUND OF THE INVENTION

The invention relates to an electromagnet coil assembly in particular an electromagnet coil assembly at least comprising a core; a winding constituting the coil being wound in a plurality of turns around said core; and multiple power taps for electrically connecting the winding to an external power circuit.

An electromagnet coil assembly as described above is for example disclosed in JP 2008-305861.

DESCRIPTION OF THE INVENTION

In general, superconductive coils are widely used for commercial and research purposes in a medical field such as NMR and MRI and an industrial field such as superconductive rotary machines (motors or generators). On the other hand, cables fabricated from high temperature superconducting (HTS) wires are known in the art and are capable of transmitting up to 10 times more current than conventional cables. Alternatively, HTS cables are also capable of carrying an equivalent amount of current at much lower voltages. HTS cables can be used in both direct current (DC) and alternating current (AC) systems. In general, high-temperature superconducting materials (abbreviated high-Tc or HTS) are operatively defined as materials that behave as superconductors at temperatures above nearly −200° C. (73, 15 K), in particular around −196.5° C. (=77 K) being the boiling point of nitrogen $N_2$.

As the field of high-temperature superconductivity is so new, the state of the art is a rapidly changing arena. Most electromagnetic coils implementing HTS materials are wound for academic purposes, which are generally hand-wound. Any coil needs power leads or power taps of some sort. However, in academics applications, coils are usually "one-offs" and not much time is invested in the manufacturability on a large scale and quantity basis.

It is thus an object of the present invention to provide an electromagnet coil assembly implementing HTS materials, which coil assembly can be mass-manufactured in a reliable, robust and cost-effective manner.

Accordingly, an electromagnet coil assembly is proposed comprising a core; a winding constituting the coil being wound in a plurality of turns around said core; and multiple power taps for electrically connecting the winding to at least an external power circuit, wherein said winding is being formed as a tape element comprising a high-temperature superconducting, HTS, material; and the multiple power taps are connected to the HTS tape winding exiting the plane of the coil at an angle.

Usually, the power taps of known coils are connected with the winding using soldered connections to copper busbars. When the winding is formed as a tape element comprising a high-temperature superconducting, HTS, material and by connecting the multiple power taps to the HTS tape winding thereby exiting the plane of the coil at an angle, a robust and reliable electrical connection of the coil with for example the external power source is obtained.

In particular also the power taps are made from a superconducting material, further enhancing the electromagnetic properties of the HTS coil. More in particular the power taps are formed as tape shaped power taps comprising a high-temperature superconducting, HTS, material. Specifically, the tape shaped power taps are made from the same HTS tape element as the winding.

In an example the power taps are connected to the HTS tape winding at an angle $\alpha$ between 30°-90°, in particular at an angle $\alpha$ of 90°. This enlarges the contact surface between the HTS tape winding and the tape shaped power taps.

In yet another advantageous embodiment, the power taps—seen from their position exiting the plane of the coil till their connection to a power terminal of the external power circuit—exhibit a curvature which curvature coincides with a field line of the magnetic field generated by the electromagnet coil assembly during operation. Herewith the exposure of the power taps to the magnetic field being generated creates a minimal disturbance and minimal exposure to electromagnetic (Lorentz) forces.

In a further embodiment of the HTS coil, said plurality of turns of said coil consists of N turns with a first power tap electrically connected with the first turn of the winding and a second power tap electrically connected with turn M of the winding, with M<N. In particular said first and second power taps are used to electrically connect the coil with an external power source.

In yet another embodiment of the HTS coil, the electromagnetic coil assembly further comprises multiple voltage taps for measuring a voltage across at least part of said plurality of turns of the winding, a first voltage tap is electrically connected with turn M+1 of the winding and a second voltage tap of said second type is electrically connected with turn O of the winding, with O≈N, in particular O=N. This allows for electrically connecting the first and second voltage taps to another type of peripheral equipment, more in particular to a quench detection or protection system and this allows for detecting a voltage difference between turn M+1 and turn O of the winding, which voltage difference being induced by an external disturbance of the magnetic field of the electromagnetic coil assembly.

The electromagnetic coil assembly implementing a HTS tape winding is further characterized by a specific winding principle, with the winding conforming:

$$\frac{(N-M)}{N} \ll 1.$$

In a specific embodiment the winding principle conforms to:

$$0.01 \ll \frac{(N-M)}{N} \ll 0.10.$$

As in yet another example the average winding tension of the turns 1 till M of said plurality of turns is lower than the average winding tension of the turns M+1 till N of said plurality of turns, it further improves the performance of the HTS coil assembly. In particular, when the turns M+1 till N are applied with an average winding tension higher than the average higher winding tension of the turns 1 till M, the inner section of [1 . . . M] turns of the winding are mechanically confined by the outer section of [M+1 . . . N] turns of the winding, also improving the mechanical stability of the coil.

In an example of the HTS coil assembly the core is a ferromagnetic core, whereas in another advantageous example the core is a non-ferromagnetic core.

In a further advantageous example at least each power tap comprises multiple sub-taps, enhancing the electric connectivity of the HTS coil assembly with external peripheral equipment, in particular decreasing the contact resistance between the individual sub-taps and the HTS tape winding.

Advantageously, the HTS material is at least one of the materials from the group consisting of (RE)BCO, BSCCO, TBCCO.

BRIEF DESCRIPTION OF THE DRAWINGS

The invention will now be discussed with reference to the drawings, which show in.

For a proper understanding of the invention, in the detailed description below corresponding elements or parts of the invention will be denoted with identical reference numerals in the drawings.

DETAILED DESCRIPTION OF THE DRAWINGS

Figure 1A:
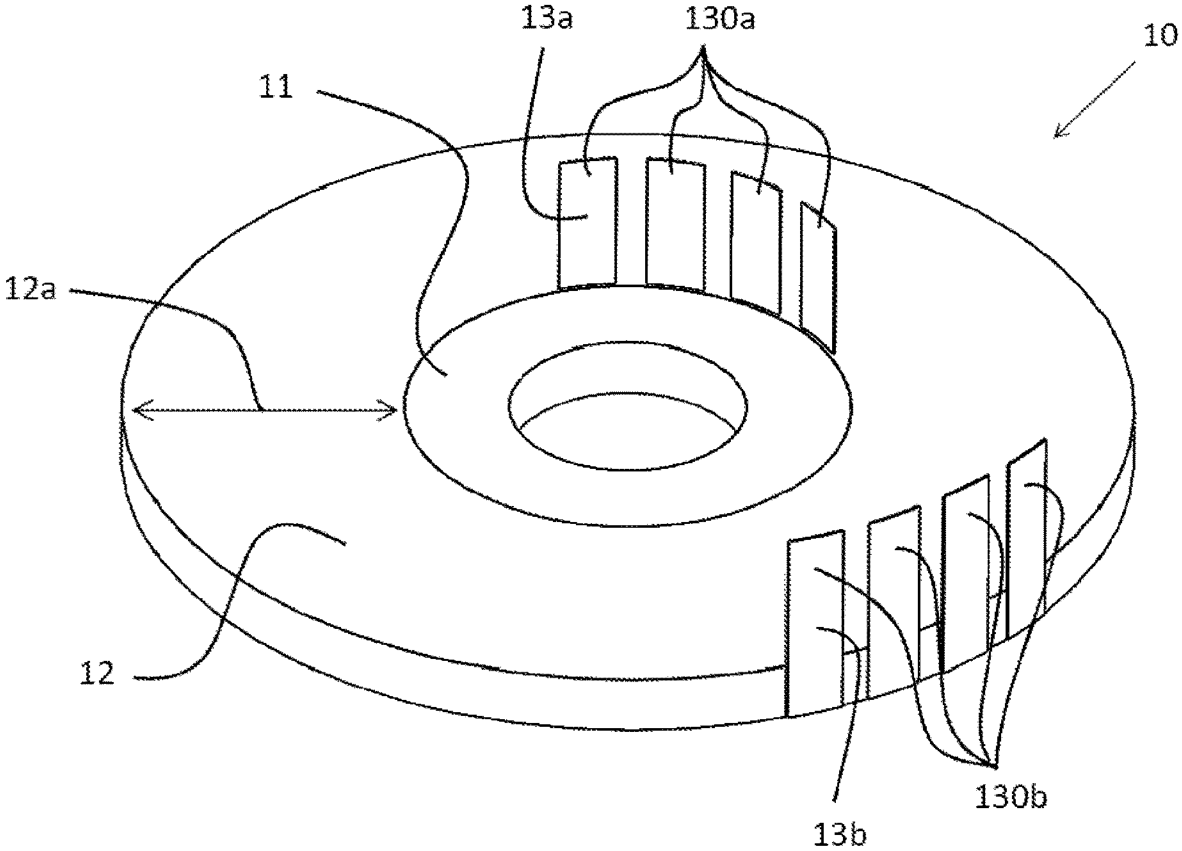
FIG. 1*a*-1*b* a first embodiment of an electromagnet coil assembly according to the invention.
Figure 1B:
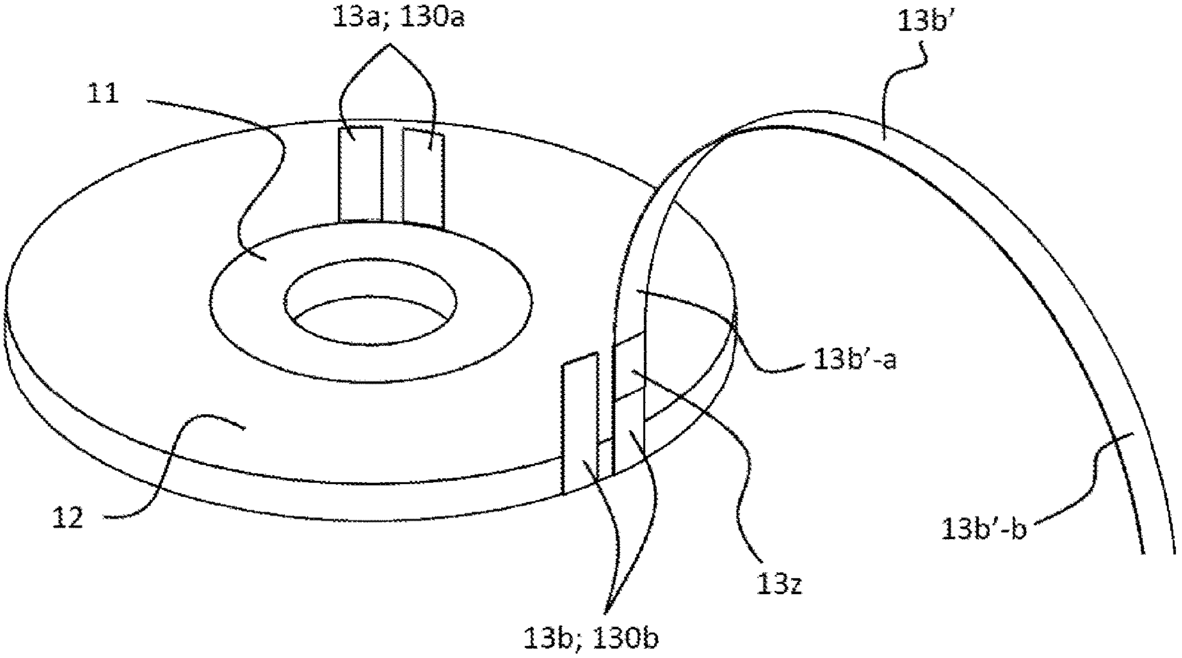

FIG. 1*a*-1*b* shows a first embodiment of an electromagnet coil assembly according to the invention. The electromagnet coil assembly is depicted with reference numeral 10 and comprises a core 11 and a winding 12. The winding 12 constitutes the coil being wound in a plurality of turns around the core 11. Preferably, the core 11 is a ferromagnetic core, however also other materials for the core 11 can be used, such as a non-ferromagnetic material.

Usually, a coil assembly also comprises multiple power taps for electrically connecting the winding 12 to an external peripheral equipment, in particular to an external power source. With reference to that, reference numerals 13*a* and 13*b* depict first and second power taps for electrically connecting the winding 12 and in particular a first section 12*a* of the winding 12, with an external power source. The first 13*a* and second 13*b* taps are thus also denoted as first and second power taps, with the first taps 13*a* being the POSITIVE-terminal (+) and the tap 13*b* being the NEGATIVE-terminal (−).

Figure 2A:
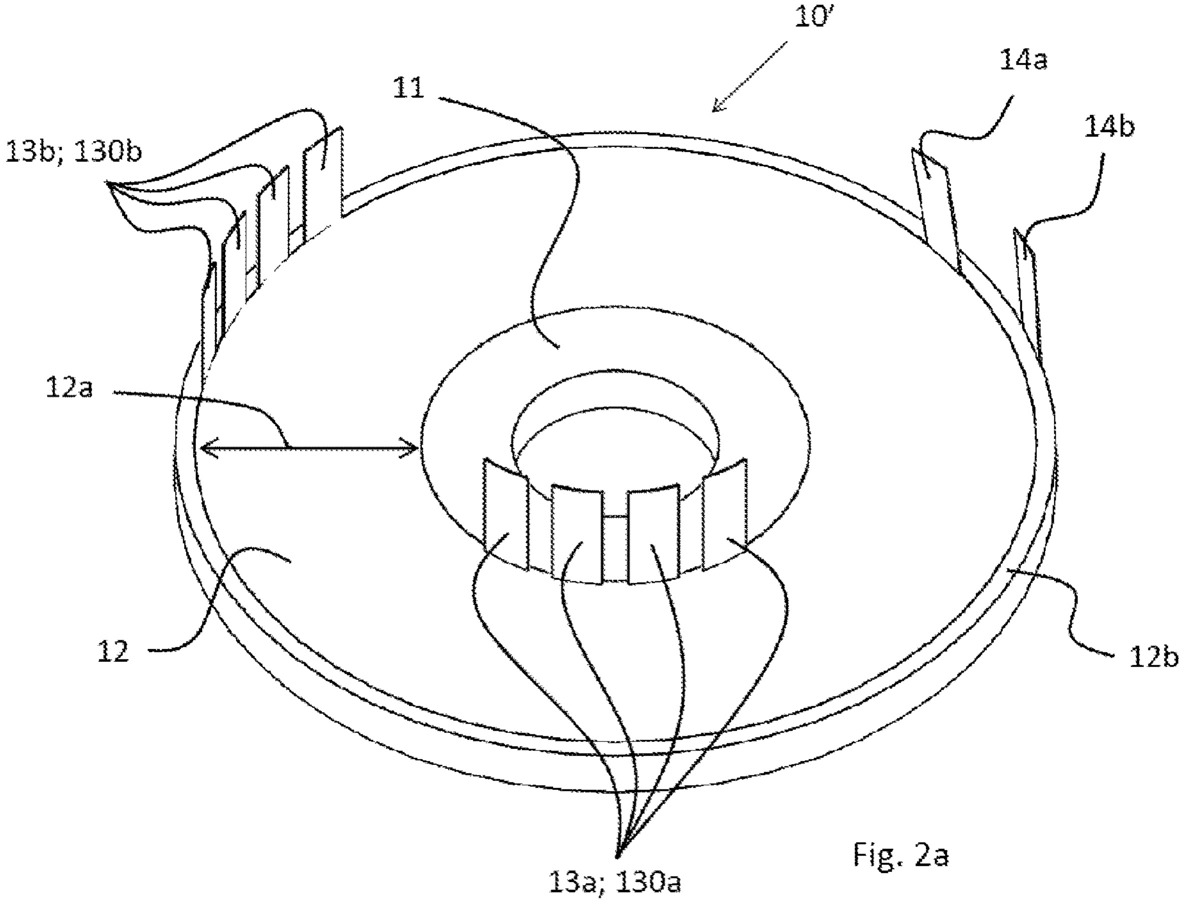
FIG. 2*a*-2*c* a second embodiment of an electromagnet coil assembly according to the invention.
Figure 3:
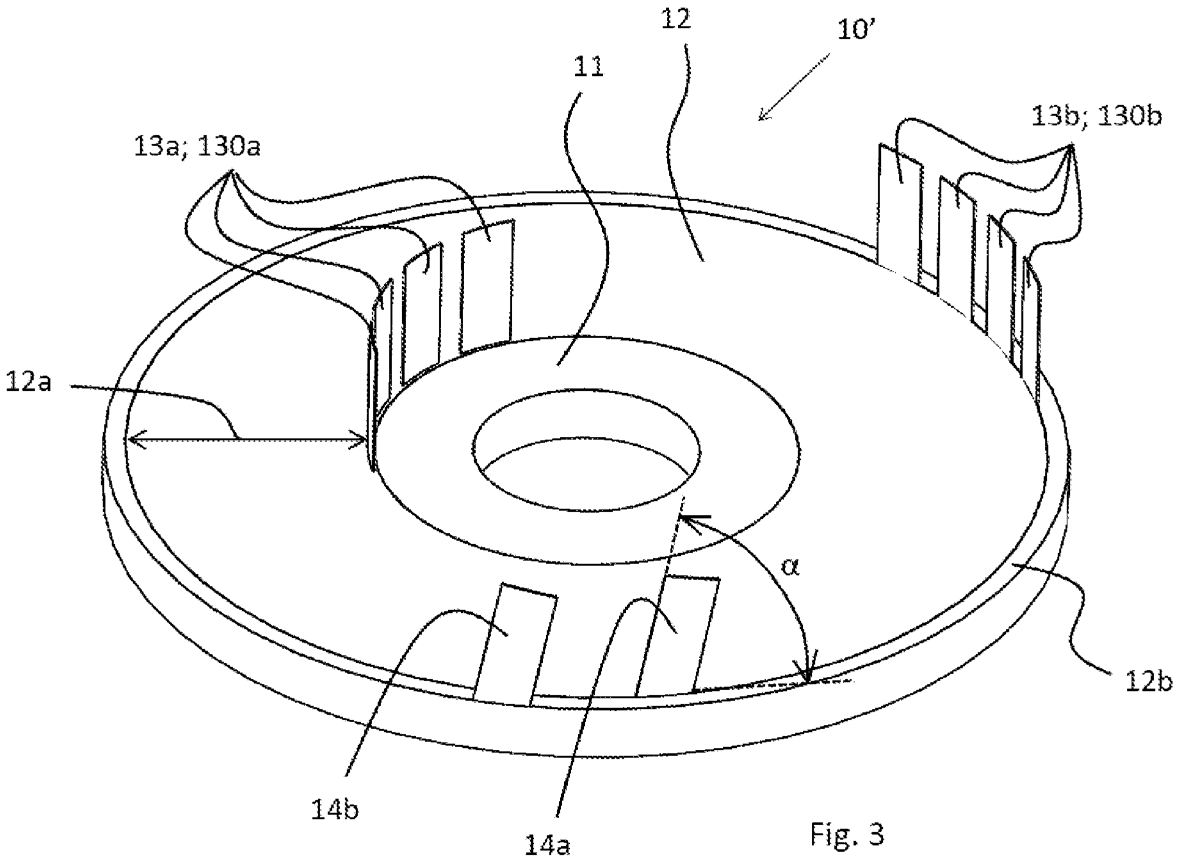
FIG. 3 a detail of the second embodiment of FIG. 2.

FIG. 2*a* and in particular FIG. 3 shown another embodiment of the electromagnetic coil assembly, indicated with reference numeral 10', having additional taps being electrically connected with the HTS winding 12. These additional taps are denoted as first and second voltage taps (reference numerals 14*a* and 14*b*) serve to electrically connect the winding 12 to another type of external peripheral equipment, preferably a voltage detector 21 as explained later in the description.

Each power tap 13*a*-13*b* and voltage taps 14*a*-14*b* may comprise multiple sub-taps 130*a* 130*b* and 140*a*-140*b* improving reliability and connectivity.

A quench protection or detection circuit connected at the voltage taps 14*a*-14*b* of the second winding section 12*b* of the winding 12 is essential to most coil applications, as a large amount of energy can be stored in a superconducting coil assembly. In the event of the coil losing its superconducting properties, while hundreds of amperes are running through the winding 12 of the coil assembly, it could result in a "meltdown" scenario which is a catastrophic failure of the system. As such, a reliable and safe quench detection mechanism is crucial for virtually all applications.

As shown in the FIGS. 1-3, the winding 12 is being formed as a tape element having a limited width dimension compared to its length dimension, said tape element 12 comprising a high-temperature superconducting, HTS, material. Examples of the HTS material can be at least one of the materials from the group consisting of (RE)BCO, BSCCO, TBCCO. But also other HTS materials can be used when composing the tape winding 12.

As depicted in FIG. 1*a* the first and second taps 13*a*-13*b* (first and second connection taps) are connected to the HTS tape winding exiting the plane of the coil at an angle. In the embodiment of FIG. 1*a*, the first and second connection taps 13*a* and 13*b* are connected to the HTS tape winding 12 at an angle α of 90°. FIG. 3 shown another embodiment wherein the first and second taps of the second type 14*a* and 14*b* are connected to the HTS tape winding 12 at an acute angle α between 30°-90°, in particular 70°-85°. Also the power taps 13*a*-13*b* can be likewise connected with the tape winding 12 under an acute angle α between 30°-90°, in particular 70°-85°. And likewise the taps of the second type 14*a* and 14*b* can be connected to the HTS tape winding 12 at an angle α of 90°.

The acute connection angle taps α of the several taps 13*a*-13*b*; 14*a*-14*b* with the HTS tape winding 12 allow for a proper exit of the taps from the winding 12 and ensures a proper, stable electrical connection. A stable electrical connection in terms of limited stress in the connection is ensured when the angle α of 90° is used.

As to the manufacturing to such electromagnetic coil assembly 10-10', the tape winding 12 is wound on the bobbin or core 11, where during the winding process, one or more of the electrical taps 13*a*-13*b*; 14*a*-14*b* are connected at a desired a angle such that said taps can exit from the plane of the coil 12. Typically the angle α is 90°, such that only an axial component of the lead direction remains, though different angles may be beneficial for specific applications. As such, the several power taps 13*a*-13*b* and voltage taps 14*a*-14*b* are mechanical confined between the tape windings ensuring a proper and stable electrical connection.

Preferably the voltage taps 13*a*-13*b* are made from a superconducting material, and in an advantageous embodiment can be formed from as a tape shaped tap comprising a HTS material. More in particular the tape-shaped voltage taps 13*a*-13*b* are manufactured from the same HTS material as the HTS tape winding 12, e.g. at least one of the materials from the group consisting of (RE)BCO, BSCCO, TBCCO. But also other HTS materials can be used for the power taps 13*a*-13*b* and voltage taps 14*a*-14*b*. In another example the voltage taps 14*a*-14*b* can be manufactured from known cupper wires.

FIG. 1*b* depicts another detail of the embodiment of FIG. 1*a* and depicts the electrical connection of the power taps 13*a* and 13*b* from the coil 12 with power terminals of an external power circuit. For the sake of clarity only power tap 13*b* is shown as a HTS tape element of a limited short length exiting the plane of the coil 12 at an angle α of 90°. HTS tape element (electrical power tap) 13*b* (as well as its individual sub-taps 130*b*) is extended with an additional HTS tape element 13*b*', which serves as an extension of the electrical power tap 13*b* (or sub-taps 130*b*) is electrically connected with its first element end 13*b*'-a with the HTS tape element 13*b* by means of an soldering connection 13*z*. The additional HTS tape element 13*b*' is electrically connected with its other element end 13*b*'-b with a power terminal of an external power source (not shown).

Similarly (although not shown) also the other electrical power tap 13*a* shaped as a HTS tape element (as well as its individual sub-taps 130*a*) can be extended with such an additional HTS tape element 13*a*' serving as an extension of the electrical power tap 13*a* (or sub-taps 130*a*) and electrically connected with its first element end 13*a*'-a with the HTS tape element 13*a* by means of an soldering connection 13*z*. The additional HTS tape element 13*a*' is subsequently electrically connected with its other element end 13*a*'-b with the other power terminal of the external power source (not shown).

Seen from its position 13*b*'-a exiting the plane of the coil 12 till its connection 13*b*'-b to a power terminal of the external power circuit (not shown), each tape-shaped power tap 13*a* and 13*b* (shown as additional HTS tape element 13*b*') exhibit a curvature, which curvature coincides with a field line of the magnetic field generated by the electromagnet coil assembly 10-10' during operation. Herewith the exposure of the power taps 13*a*-13*b* to the magnetic field being generated creates a minimal disturbance and minimal exposure to electromagnetic (Lorentz) forces. In a similar fashion also the first power tap 13*a* (as well as its individual sub-taps 130*a*) can be extended with an additional HTS tape element 13*a*' (not shown), which is electrically connected with its first element end 13*a*'-a with the HTS tape element 13*a* by means of an soldering connection 13*z* and with its other tape element end 13*a*'-b with the other power terminal of the external power source (not shown).

It is observed that both first and second power taps 13*a*-13*b* (as well as their individual sub-taps 130*a*-130*b*) can directly be formed as an elongated HTS tape element exiting the plane of the coil 12 and electrically connected with its free tape end (corresponding to tape element end 13*a*'-*b* or 13*b*'-*b*) with a power terminal of the external power source, thereby obviating the soldering connection 13*z*.

As depicted in FIGS. 1-3 the winding 12 consists of two winding sections, each denoted with 12*a* and 12*b*. Assuming that the plurality of turns of the complete coil or winding 12 consists of N turns, the first section 12*a* of the winding 12 consists of M turns, whereas the second section 12*b* consists of N minus M (N-M) turns. In view of this configuration of two winding sections 12*a* and 12*b*, the first power tap 13*a* is electrically connected with the first turn of the winding closest to the core 11. The second power tap 13*b* is electrically connected with turn M of the winding 12. Again, note that M<N. Both first and second power taps 13*a*-13*b* are electrically connected with the POSITIVE- and NEGATIVE-terminal of an external power source of the electromagnetic coil assembly 10-10' for energizing the coil 12.

As to the second winding section 12*b*, the first voltage tap 14*a* type is electrically connected with turn M+1 of the second section 12*b* of the winding 12 and the second voltage tap 14*b* is electrically connected with turn O of the winding 12. Turn O of the winding 12 is located at the outer circumference side of the coil assembly, whereas the first turn (turn 1) is located at the core side 11 of the coil assembly. Preferably O=N, in particular O=N.

As to a comparison of the number of windings of each winding section 12*a* and 12*b* the following formula can apply:

$$\frac{(N-M)}{N} \ll 1.$$

In particular:

$$0.01 \ll \frac{(N-M)}{N} \ll 0.10.$$

For both formulas, N is the total amount of turns of the coil, whereas M is the number of turns between the first and second power taps 13*a* and 13*b*.

In particular the average winding tension of the turns 1 till M of said plurality of turns of the first winding section 12*a* is lower than the average winding tension of the turns M+1 till N of said plurality of turns of the second winding section 12*b*. In particular, when the turns M+1 till N of the second section 12*b* are applied with an average winding tension higher than the average higher winding tension of the turns 1 till M of the first winding section 12*a*, the inner winding section 12*a* of [1 . . . M] turns of the winding are mechanically confined by the outer winding section 12*b* of [M+1 . . . N] turns of the winding, also improving the mechanical stability of the coil.

The use of two windings sections 12*a* and 12*b* in a coil assembly is known as "overbanding". However, in these embodiments 10 and 10' of the electromagnetic coil assemblies, the "overbanding" consists of forming an additional winding section 12*b* radially around the first winding section 12*a*, i.e. the second winding section 12*b* forms a ring of (N-M) turns around the complete coil 12.

In an embodiment the winding of the second winding section 12*b* consist of the same HTS tape winding as that of the first winding section 12*a*. In another example another material is used, such as a metal tape having the same width dimension as the HTS tape winding 12 forming the first winding section 12*a*. In that particular example, the HTS tape winding is terminated after M turns with the second connection tap 13*b* and the winding continues with only a metal tape winding forming the second winding section 12*b* consisting of N-M turns. By continuing the winding after M turns past the position or connection of the second power tap 13*b* with a similar shaped tape winding (either the same HTS tape winding or a different metal tape winding) any free or lose ending winding part is avoided, which free or lose ending winding part would otherwise be exposed to the magnetic field being generated and might cause disturbances due to electromagnetic (Lorentz) forces.

In another example, the HTS tape winding continues from the first winding section 12*a* into the second winding section 12*b*.

Figure 2B:
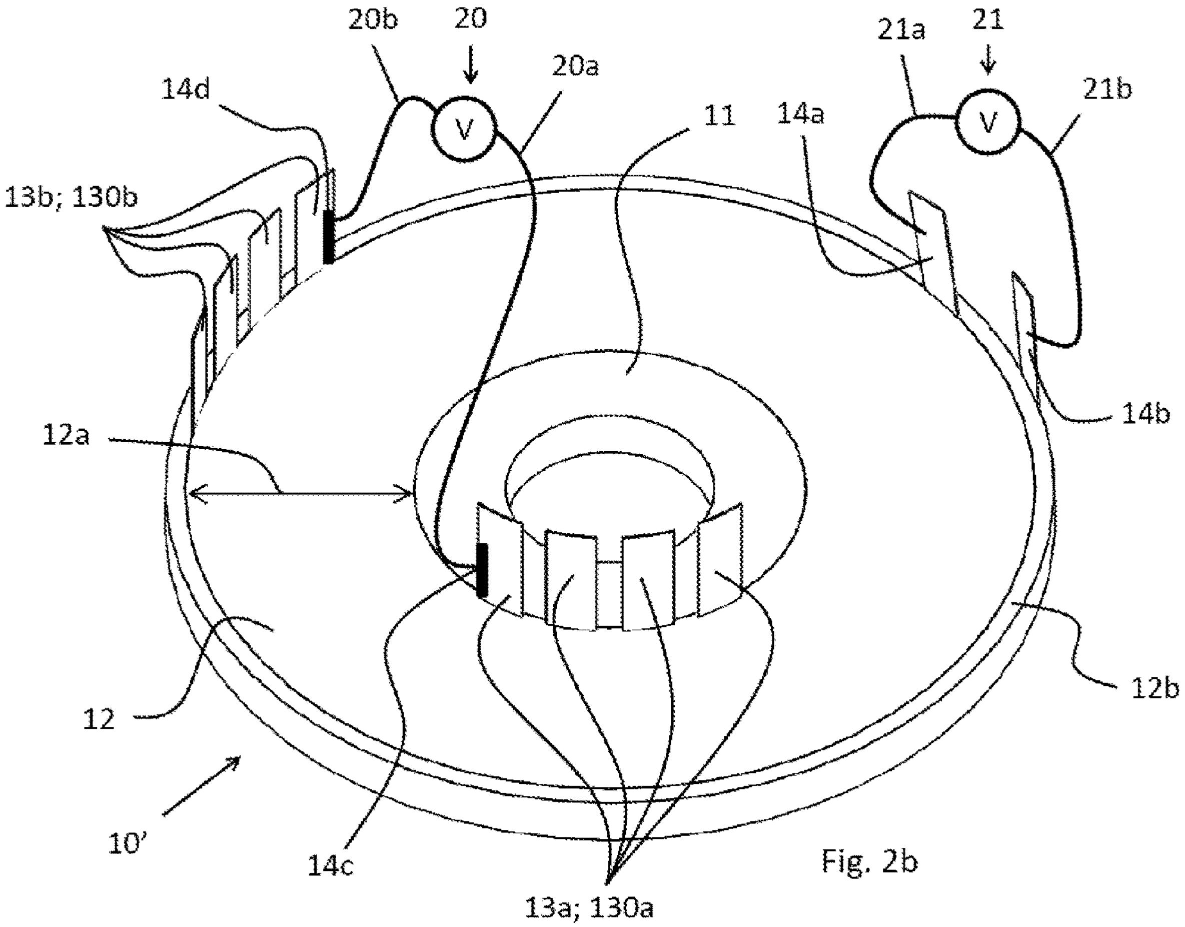
Figure 2C:
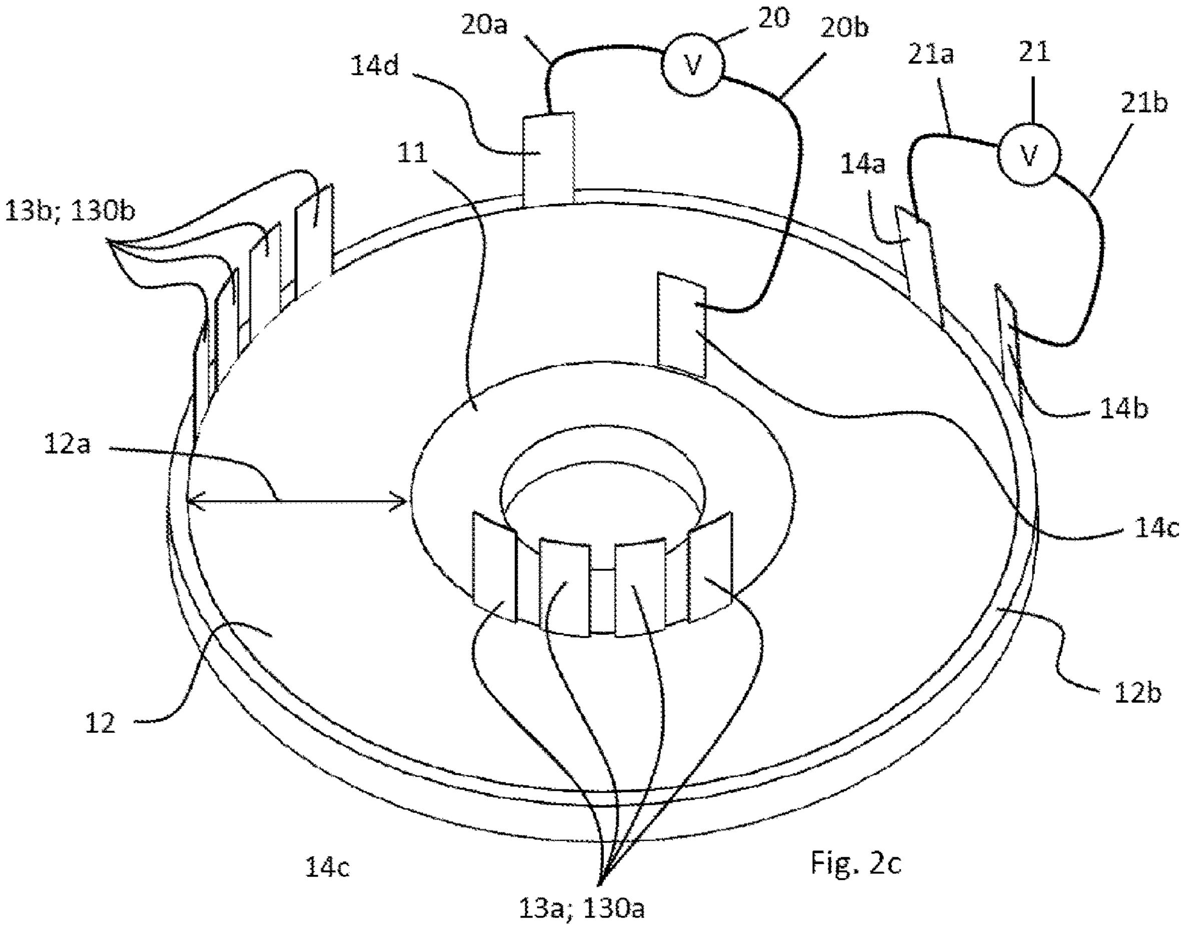

As shown in FIGS. 2*b*-2*c*, the electromagnetic coil assembly 10' comprises a third and fourth voltage tap 14*c*-14*d*, which are each connected with a turn of the coil within the first winding section 12*a*. Each third and fourth voltage tap 14*c*-14*d* can be electrically connected with the first and second power tab 13*a*-13*b* and hence with the first and $M^{th}$ turn of the first winding section 12*a* as shown in FIG. 2*b*. Alternatively—as shown in FIG. 2*c*—each third and fourth voltage tap 13*c*-13*d* can be electrically connected with a turn of the first winding section 12*a*.

Additionally, each third and fourth voltage tap 14*c*-14*d* is electrically connected with a quench voltage detection system 20 using connecting wires 20*a*-20*b*.

A quench voltage can be detected using the quench voltage detection system 20 between the third and fourth voltage taps 14*c*-14*d*. However, an electromagnetic coil assembly according to the invention can be implemented in contactless actuating systems and an actuator (carrier) passing the electromagnetic coil assembly will disturb the magnetic field generated by the coil. Such external disturbance or changes in the magnetic field will induce a current in the turns/windings of the first winding section 12*a*, which unfortunately may yield a false positive quench trigger.

Due to the winding configuration of two winding sections 12*a* and 12*b*, two concentric coils are created. By utilizing the additional windings M+1 till N forming the second winding section 12*b, a* zero voltage reading could be measured between the first and second voltage taps 14*a*-14*b*, when the coil assembly is powered by the external power source over the first and second power taps 13*a*-13*b*, even when no external disturbance of the magnetic field occurs. However, in the event of an external disturbance of the magnetic field, for example due to an actuator of an contactless actuation system passing the electromagnetic coil assembly, the external disturbance of the magnetic field will induce a current in the second winding section 12*b*, and an induced voltage difference across the voltage taps 14*a* and 14*b* between turns M+1 and 0 (N) will be measured using an additional voltage detection system 21 being connected to both first and second voltage taps 14*a*-14*b* using connecting wires 21*a*-21*b*.

By implementing the two further (third and fourth) voltage taps 14*c*-14*d* within the first winding section, for example electrically connecting the third voltage tap 14*c* near or with the first power tap 13*a* and electrically connecting the fourth voltage tap 14*d* near or with the second power tap 13*b* but at least with a turn<turn M), a quench or a loss of superconductivity resulting in a rapid rise of the Ohmic resistance within the first winding section 12*a* can be effectively detected by means of a voltage difference measured across both third and fourth voltage taps 14*c*-14*d* using a quench voltage detection system 20.

However, also an external disturbance of the magnetic field as outlined above will be detected by the third and fourth voltage taps 14*c*-14*d*, and as such cannot differentiate alone between an actual quench within the first winding section 12*a* of the coil 12 or an external disturbance of the magnetic field. Therefore, implementing also a quench voltage detection system 21 for the overbanding winding section 12*b* any voltage difference measured across the two voltage taps 14*a*-14*b* would directly correlate to external disturbances of the magnetic field. Thus, by performing differential voltage measurement over both the voltage taps 14*c*-14*d* and the two voltage taps 14*a*-14*b*, or more in particular of both winding sections 12*a* and 12*b* negates external influences and yields a more reliable quench-detection method.

REFERENCE NUMERALS

10-10' Embodiments of an electromagnet coil assembly
11 Core
12 Winding constituting the coil formed as a HTS tape
12*a* First group of plurality of turns [1; M]
12*b* Second group of plurality of turns [M+1; N]
13*a* First electrical power tap
13*b* Second electrical power tap
13*b*' additional HTS tape element/extension of electrical power tap
13*z* soldering connection
14*a* First electrical voltage tap
14*b* Second electrical voltage tap
14*c* Third electrical voltage tap
14*d* Fourth electrical voltage tap
130*a*-130*b* Sub-taps of electrical taps
140*a*-140*b* Sub-taps of electrical taps

The invention claimed is:

1. An electromagnet coil assembly comprising a core;
a winding constituting the coil being wound in a plurality of turns around said core; and
multiple power taps for electrically connecting the winding to an external power circuit,
wherein said winding is being formed as a tape element comprising a high-temperature superconducting, HTS, material,
wherein the multiple power taps are connected to the HTS tape winding exiting a plane of the coil at an angle, and
wherein the power taps, seen from position of the power taps exiting the plane of the coil until connection of the power taps to a power terminal of the external power circuit, exhibit a curvature which coincides with a field line of a magnetic field generated by the electromagnet coil assembly during operation.

2. The electromagnet coil assembly according to claim 1, wherein the power taps are made from a superconducting material.

3. The electromagnet coil assembly according to claim 2, wherein the power taps are formed as tape shaped power taps comprising a high-temperature superconducting, HTS, material.

4. The electromagnet coil assembly according to claim 1, wherein the power taps are connected to the HTS tape winding at an angle a between 30°-90°, in particular at an angle α of 90°.

5. The electromagnet coil assembly according to claim 1, wherein said plurality of turns of said coil consists of N turns with a first power tap electrically connected with the first turn of the winding and a second power tap electrically connected with turn M of the winding, with M<N.

6. The electromagnet coil assembly according to claim 5, further comprising multiple voltage taps for measuring a voltage across at least part of said plurality of turns of the winding, wherein a first voltage tap is electrically connected with turn M+1 of the winding and a second voltage tap is electrically connected with turn O of the winding, with O=N.

7. The electromagnet coil assembly according to claim 5, with:

$$\frac{(N-M)}{N} \ll 1.$$

8. The electromagnet coil assembly according to claim 7, with:

$$0.01 \ll \frac{(N-M)}{N} \ll 0.10.$$

9. The electromagnet coil assembly according to claim 1, wherein an average winding tension of the turns 1 till M of said plurality of turns is lower than the average winding tension of the turns M+1 till N of said plurality of turns, and
wherein N is a total number of turns in the coil, and M is an intermediate turn such that M lies between a first turn and an Nth turn of the coil, with M<N.

10. The electromagnet coil assembly according to claim 1, wherein the core is a ferromagnetic core.

11. The electromagnet coil assembly according to claim 1, wherein at least each power tap comprises multiple sub-taps.

12. The electromagnet coil assembly according to claim 1, wherein the HTS material is at least one of the materials from the group consisting of (RE)BCO, BSCCO, TBCCO.

* * * * *